No. 643,169. Patented Feb. 13, 1900.
H. C. SWAN.
SHAFT CLAMP.
(Application filed Mar. 27, 1899.)
(No Model.)
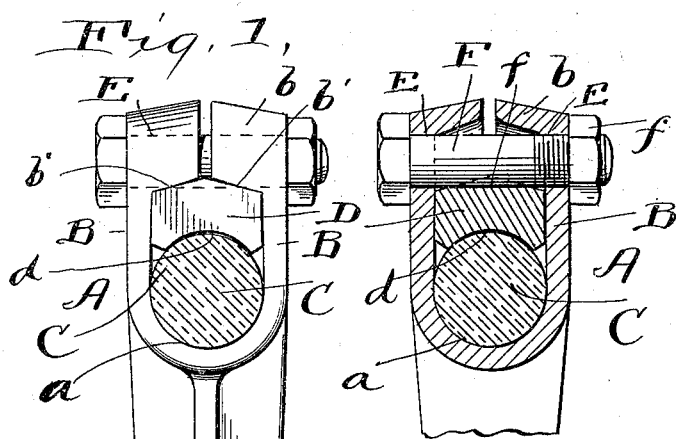
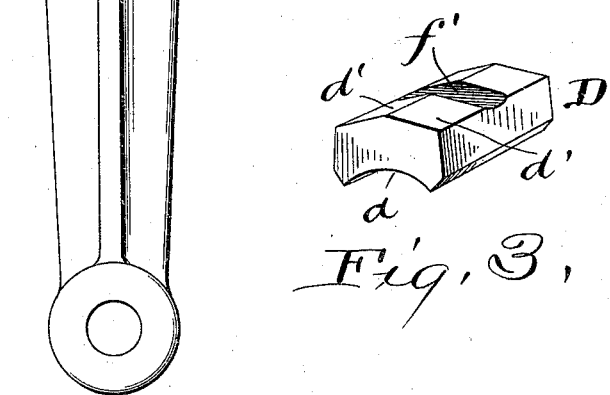
Witnesses.
E. B. Gilchrist
C. J. Henderson.
Inventor,
Henry C. Swan.
by CM Austin
atty.

UNITED STATES PATENT OFFICE.

HENRY C. SWAN, OF OSHKOSH, WISCONSIN.

SHAFT-CLAMP.

SPECIFICATION forming part of Letters Patent No. 643,169, dated February 13, 1900.

Application filed March 27, 1899. Serial No. 710,548. (No model.)

*To all whom it may concern:*

Be it known that I, HENRY C. SWAN, a citizen of the United States of America, residing at Oshkosh, Winnebago county, State of Wisconsin, have invented certain new and useful Improvements in Shaft-Clamps, of which the following is a specification in such full, clear, and exact terms as to enable any person skilled in the art to which it appertains to make, construct, and use the same.

My invention relates to improvements in the method of attaching crank-handles, levers, and similar devices to a round shaft, and has among its objects to provide a clamp that can be rotated upon the shaft and rigidly secured in its adjusted position and that can be attached to a bent or curved shaft.

In the accompanying drawings, Figure I represents a side elevation of my improved clamp provided with a lever-arm and secured to a shaft, that is shown in section; Fig. II, a side elevation in section; Fig. III, a view in perspective of the locking-cotter.

The clamp A, with which the lever, crank-handle, or similar object may be formed integral or suitably attached, is recessed to form a bearing $a$ on its inner face. The sides of the recess B are provided with projections $b$, that extend partially across the opening of the recess and have their inner faces $b'$ oppositely inclined or beveled. The shaft C or other object to which the clamp is to be secured is seated in the bearing provided by the clamp. A cotter D, that has one side provided with a groove $d$, eccentric to the shaft, and its opposite side provided with inclines or bevels $d'$, corresponding with the bevels formed on the inner face of the projections, is inserted between the shaft and said projections. A bore E is provided through the center of the projections to receive a bolt F, that is secured in place by a nut $f$. The cotter is recessed, as at $f'$, to permit the passage of the bolt and prevent said cotter from slipping lengthwise of the shaft.

After the clamp has been placed on the shaft the cotter is inserted between said shaft and projections. The bolt is then inserted and the nut is tightened, which brings the beveled faces of the projections into play against the inclines on the cotter, thereby exerting a wedging action and forcing the cotter into contact with the shaft with great force and holding the same firmly and rigidly against displacement. By this construction the cutting and consequent weakening of the shaft to provide a key-seat is not only avoided, but the clamp can be rotated upon the shaft and attached in any desired position in a plane at right angles to the shaft. The clamp is adjustable longitudinally of the shaft and can also be secured to and removed from the shaft over a curve or bend formed therein. The wedging action exerted by the beveled projections against the bevels provided on the cotter force the same into rigid engagement with the shaft, so that the parts are held rigidly and firmly against displacement. The clamp is easily applied and can be quickly removed or its position changed and involves the use only of extremely simple parts.

What I claim is—

The combination with a shaft, of a crank-arm provided with a recess formed with parallel side walls, and having its inner end curved to provide a bearing for the shaft, said side walls being slightly resilient and extending a suitable distance beyond the shaft and provided at their outer ends with projections, having their inner faces oppositely beveled, arranged above and partly inclosing the shaft, a cotter between the shaft and the projections, said cotter being provided on one side with oppositely-inclined bevels corresponding to and engaging with the bevels on said projections and on its other side with edges or ridges formed by grooving the cotter eccentrically to the shaft, and means arranged above the cotter for drawing the projections toward each other to force the edges or ridges on said cotter into engagement with the shaft and hold the crank-arm against rotation thereon, substantially as described.

In testimony whereof I sign this application, in the presence of two witnesses, this 23d day of March, 1899.

HENRY C. SWAN.

Witnesses:
F. B. WILLMOTT,
C. I. HENDERSON.